(12) United States Patent
Yalamanchilli

(10) Patent No.: US 8,386,419 B2
(45) Date of Patent: Feb. 26, 2013

(54) DATA EXTRACTION AND TESTING METHOD AND SYSTEM

(76) Inventor: Narendar Yalamanchilli, Sterling, VA (US)

( * ) Notice: Subject to any disclaimer, the term of this patent is extended or adjusted under 35 U.S.C. 154(b) by 106 days.

(21) Appl. No.: 13/106,139

(22) Filed: May 12, 2011

(65) Prior Publication Data

US 2012/0290527 A1 Nov. 15, 2012

(51) Int. Cl.
*G06F 7/00* (2006.01)
*G06F 9/44* (2006.01)
(52) U.S. Cl. ........................ 707/602; 717/126
(58) Field of Classification Search ................ 707/602; 717/126, 101
See application file for complete search history.

(56) References Cited

U.S. PATENT DOCUMENTS

| | | | |
|---|---|---|---|
| 7,010,546 B1 * | 3/2006 | Kolawa et al. | 707/694 |
| 7,337,169 B2 * | 2/2008 | Galindo-Legaria et al. | 1/1 |
| 2005/0033632 A1 * | 2/2005 | Wu et al. | 705/10 |
| 2011/0010685 A1 * | 1/2011 | Sureka et al. | 717/102 |

\* cited by examiner

*Primary Examiner* — Hung T Vy
(74) *Attorney, Agent, or Firm* — Williams Mullen

(57) ABSTRACT

The present method and apparatus provides for automated testing of data integration and business intelligence projects using Extract, Load and Validate (ELV) architecture. The method and computer program product provides a testing framework that automates the querying, extraction and loading of test data into a test result database from plurality of data sources and application interfaces using source specific adaptors. The test data available for extraction using the adaptors include metadata such as the database query generated by the OLAP Tools that are critical to validate the changes in business intelligence systems. A validation module helps define validation rules for verifying the test data loaded into the test result database. The validation module further provides a framework for comparing the test data with previously archived test data as well as benchmark test data.

20 Claims, 6 Drawing Sheets

DATA EXTRACTION AND TESTING METHOD AND SYSTEM

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF INVENTION

The present invention relates generally to automated data testing and more specifically to a system and computerized method for automated testing of data integration and business intelligence.

BACKGROUND OF THE INVENTION

A typical modern enterprise has a plurality of applications used to handle day-to-day operations of the business. These applications are often referred to as On-Line Transaction Processing (OLTP) applications. There is often need to relate the data stored in multiple data stores and report on it. A Data Integration project typically involves collecting data residing in multiple sources (e.g. databases, flat files) and making it available for users in the form of reports or applications. Data Warehouse is one of the most popular Data Integration architecture that involves extracting data from different sources, transforming it and loading (ETL) it into a target data store. Data Warehouses are also typically referred to as On-Line Analytical Processing (OLAP) applications.

Business intelligence projects make use of OLAP tools (e.g. Oracle Business Intelligence Enterprise Edition®, SAP Business Objects®, IBM Cognos®) to build analytical applications with data federated from multiple data sources, typically a data warehouse. The OLAP tools provide a layer of abstraction that allows the user to perform analysis without knowing the underlying details of the database tables. The developer of the analytical application creates and modifies the metadata model of the OLAP tool based on requirements for report data elements. This OLAP tool metadata model specifies the definition of reporting data elements using the data structures available in the physical data stores as well as the relations between them. The query engine of OLAP tools uses the metadata model to automatically generate the queries used to retrieve data from physical data sources and provide user friendly reporting views based on user request.

Implementation of a data integration and business intelligence project is generally complex in nature due to the multiple data sources involved. Data quality and performance are often the most important aspects determining the success of these projects. Testing is critical for the success of data integration projects so that users can trust the quality of the information they access. While most aspects of the design of data integration and business intelligence systems have received considerable attention, existing techniques do not provide testing of data integration and business intelligence systems.

Testing of data integration projects is a difficult task due to the multiple data sources involved as well as the large volumes of data. Testing is typically done by running queries against the source and target data sources and manually comparing counts. Running and comparing of data for large number of test cases is a tedious process when done manually. Limited automation has been achieved in some cases by developing custom scripts to compare the counts of data between different data sources or comparing query output to benchmark (baseline) data stored in flat files. This type of automation often requires coding and is limited to testing of smaller samples of data. Testing is further complicated because ETL process can run in incremental mode or full mode. When ETL runs in full mode, it refreshes or reloads all the data in the data warehouse. During incremental mode, only the data changes occurring since the last ETL run is loaded. The differences in the incremental and full load mode of the ETL process often make it necessary to create separate sets of test cases for these two modes.

Testing of Business Intelligence projects is also very challenging due to the abstraction provided by the OLAP tool metadata model. The primary advantage of a business intelligence system is that it provides capability for the report analyst to create and run new reports using report data elements supported by the metadata model. But from a testing standpoint this is a huge problem because the scenarios for report requests are not fixed and testing all the scenarios is often impractical due to the large permutation and combination of possible reporting queries. As the business intelligence application matures, it becomes very difficult to assess the impact of the changes in the metadata model on existing reports because of the effort involved in testing all the reports. Most of the current forms of testing involve manual spot checking by running a few reports and comparing it to the data queried from the physical data sources (e.g. databases). Often there is very little or no regression testing performed for any changes being made for these applications since there is no easy way to automate this testing. The impact on existing reports can vary from throwing errors, showing wrong data or bad performance which is usually detected once the change goes to production. This leads to lack of trust from the users on the data shown in the reports by the business intelligence applications.

As agreed by persons skilled in the relevant art(s), there are several differences when it comes to testing of OLTP and OLAP applications: the focus of OLTP application testing is on software code while OLAP application testing is directed at the validation of the correctness of data; the volume of data involved in OLAP application testing is typically very large when compared to volume of data involved in the testing of OLTP applications; data integration projects present different set of challenges for testing of full and incremental loads; performance testing of data integration projects presents different set of challenges including the need for large volumes of test data when compared to OLTP applications; and the number of use cases for OLTP applications are finite while the test scenarios for regression and performance testing of OLAP applications can be virtually unlimited.

Plurality of test tools (e.g. the HP® Quality Center) are available for testing OLTP applications that allow record and replay of UI based transactions as well as testing web services (e.g. SoapUI). Limited automation has been achieved by using these test tools for testing of analytical applications by using them to record and play running of a report from the UI but these tools provide limited support if any to compare the report data or the database query generated by the business intelligence tool. Prior art does not provide any simple and automated way to compare the data samples dynamically retrieved from data sources or allow these data samples to be compared with the samples from previous test runs for large volumes of data.

FIG. 1 is a prior art high-level flowchart view of an exemplary Data Warehouse (OLAP) project which is one of the most common types of data integration project. Reporting requirements 103 typically form the input for the design and development of the ETL (or ELT) 101 and OLAP metadata 105 in a data warehousing project. Data is extracted from multiple sources 100 and loaded into a data warehouse 104 using an ETL (or ELT) process 102. An OLAP tool 106 is generally used to report 107 on the data in the data warehouse. Unlike regular reporting tools, OLAP tools have a query engine that generates the query dynamically based on the report request and the metadata model defined.

Testing of the ETL (or ELT) metadata 101 is typically done by querying existing data in source data store 100 or by entering some sample test data 108 using the application interface of the source data store 100 and Verifying Data Loaded 109 after it is extracted, transformed and loaded correctly into the Target Data Store 102. Since the ETL (or ELT) process 102 can run in incremental mode where only the data that changed since the last ETL run gets extracted, transformed and loaded or full mode where the tables in the target data store 104 is truncated and reloaded with all the data from the source data store 100 testing will need to be done for the two modes separately.

Testing of the OLAP tool metadata 105 can involve large number of reports since the tool allows for potentially infinite number of reports to be created dynamically by the user in the production system. Typically, testing is done by Verifying Report Data and SQL Query Generated 110 for a core set of reports 107 is same as expected by querying the target data store 104. The query generated dynamically by the OLAP query engine 106 can also be verified to make sure that the right query is getting generated for these core reports every time there is a change to the OLAP tool metadata model.

Integration testing can be done by verifying that the data displayed or queried from the source data store 100 matches with the data shown in the reports 107.

However there are several challenges in running these tests. The data volumes involved in the testing are typically very high and there can potentially be multiple source data stores 100 of different types from which data gets loaded into the target data stores 104. The potentially large number of reports that can be created using the OLAP tool presents a testing problem by itself. Comparing the data from the reports of an analytical application with that of the source or target data stores can also be a challenge since they are produced in different formats in different software programs. Verifying that the query generated by the OLAP Query Engine 106 has not changed due to an OLAP metadata 105 change is also a very tedious process due to the large number of reports as well as the complex queries being generated by the OLAP query engine 106.

As such, there exists a need in the art for an automated data extraction and validation process overcoming the limitations illustrated in FIG. 1 above.

SUMMARY OF THE INVENTION

The present invention provides a system, method and computer program product for automating the testing of Data Integration and Business Intelligence projects so that rigorous regression and performance testing can be performed. The present invention provides the Extract, Load and Validate (ELV) architecture for testing of Data Integration and Business Intelligence systems.

In one embodiment, the present invention provides a modularized client-server based test system with a plug-and-play adaptor module that interfaces with multiple data sources (e.g. Databases, OLAP tools, XML, Flat files, Web Services, HTML, XPATH, Excel, LDAP), a test case definition module with components containing queries for retrieving test data from multiple data sources, a test result database for storing the test data retrieved by the components from multiple sources, a validation module for verification of the data in the test database against previous result data as well as predefined benchmark data and a test execution plan module for grouping and executing of test cases at scheduled times in the server thus automating the test case execution process.

In one embodiment, the present invention also provides a graphical user interface for defining test case templates and allowing for automatic generation test cases based on metadata from the source data stores.

BRIEF DESCRIPTION OF THE DRAWINGS

Like reference numbers and designations in the various drawings indicate like elements.

DETAILED DESCRIPTION

In the following description, reference is made to the accompanying drawings that form a part hereof, and in which is shown by way of illustration specific embodiments in which the invention may be practiced. It is to be understood that other embodiments may be utilized and design changes may be made without departing from the scope of the present invention.

Figure 1:
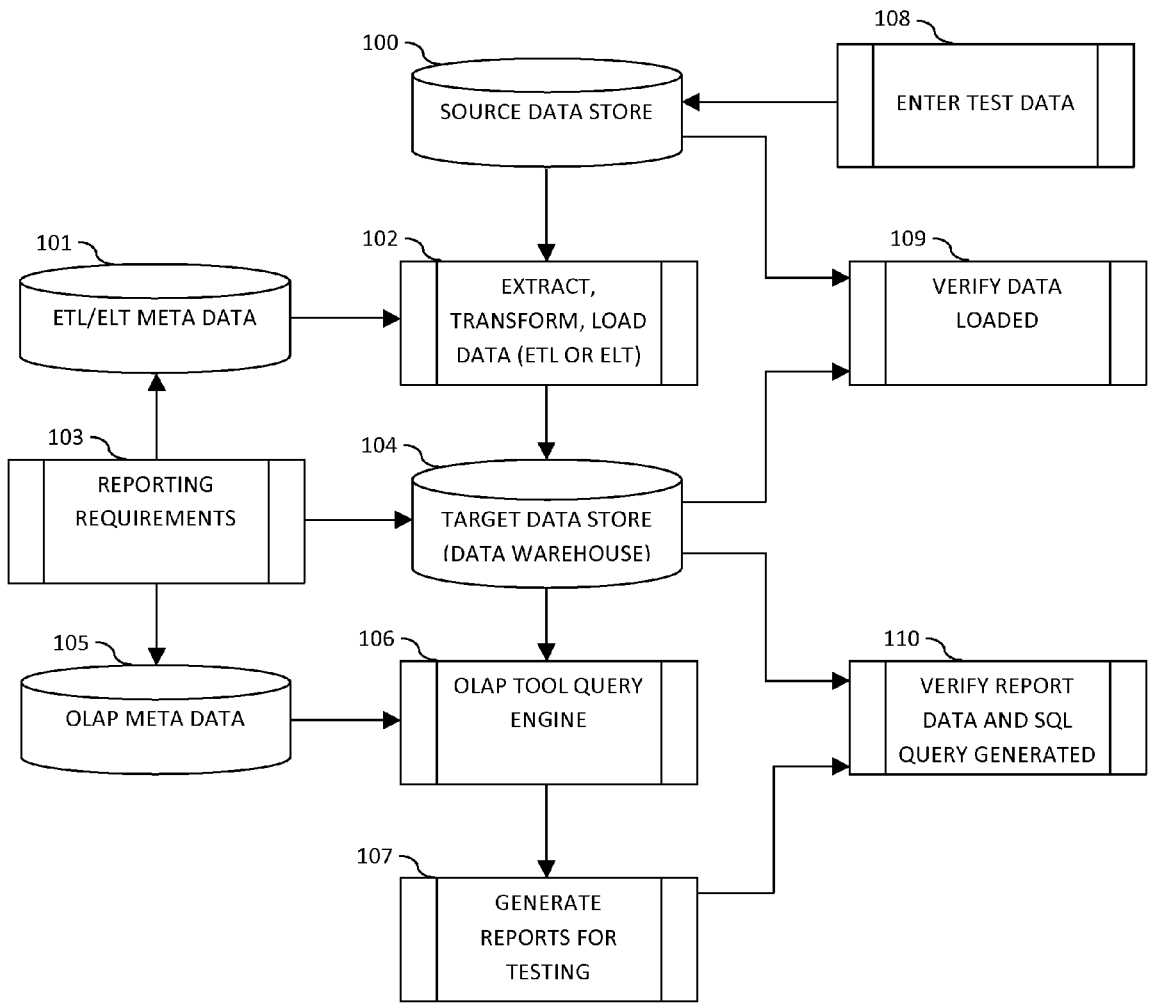
FIG. 1 is a prior art high-level flowchart view of an exemplary Data Warehouse project.
Figure 2:
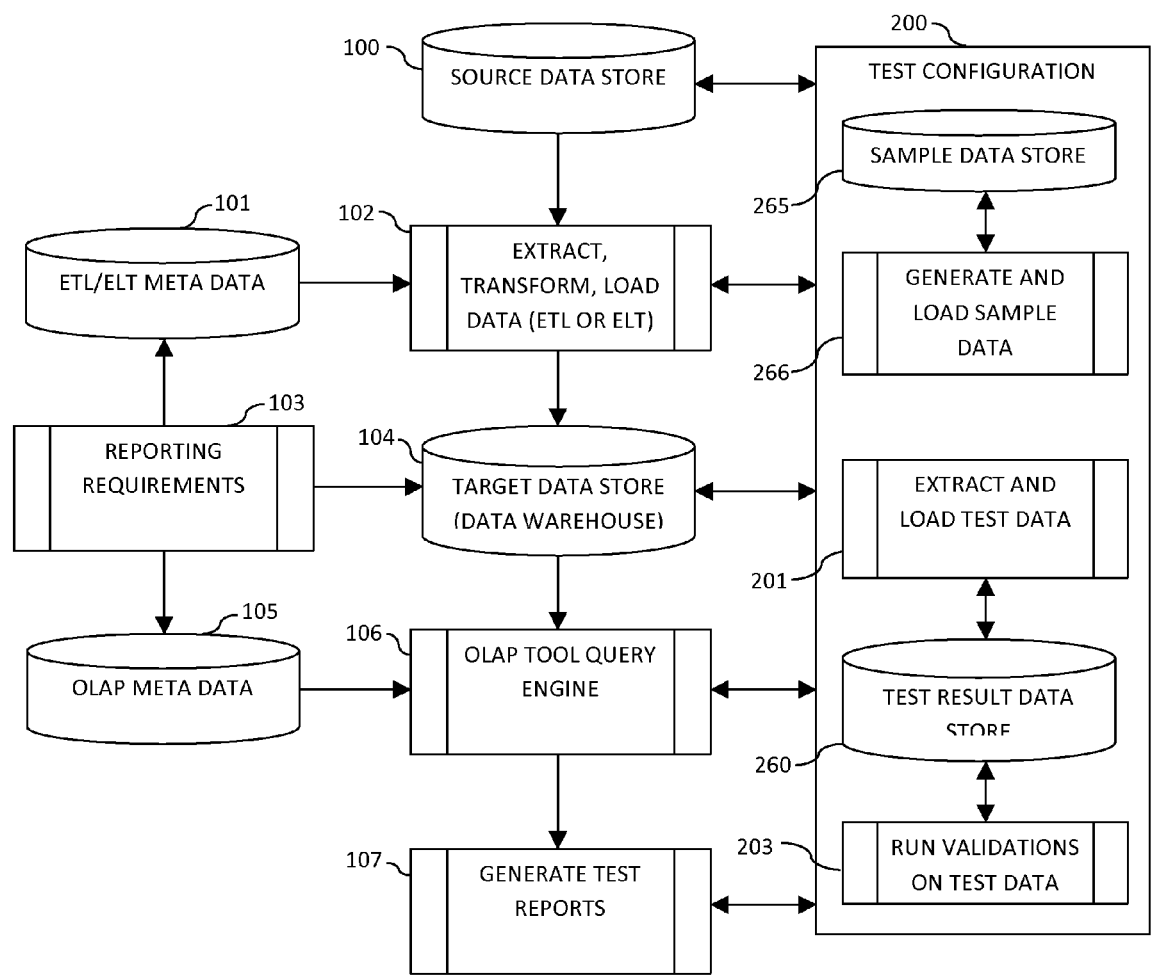
FIG. 2 is illustrates one embodiment of the ELV architecture fitting within the testing process of an exemplary data warehouse project.

FIG. 2 shows how the present invention, in one embodiment, would fit in the testing process of an exemplary data warehouse project, such as the system illustrated in FIG. 1. In one embodiment of the present invention, the Test Configuration 200 automates the creation of sample test data 266 in the source data store 100 by either generating the test data using a sample data store 265 or recording and playing the steps in the source system application interface to create new sample test data in the source data store 100. The present invention improves the current testing processes by, among other features, automating the Query, Extraction and Load 201 of the test data to a test result data store 260 from multiple data sources and running validations on the test data into the test result data store. In one embodiment, the test result data store 260 can be a database where validation queries or procedures can be run to verify that the test data from source and target data store is matching as expected, as described in further detail below. The test data extracted from the OLAP data sources can include the report data as well as the query generated by the OLAP Query engine 106 while running the report 107. Storing the test data results in a data store allows for comparison of test data extracted from multiple sources as well as comparing the latest test data with the test data from previous runs or bench mark (baseline) data.

Figure 3:
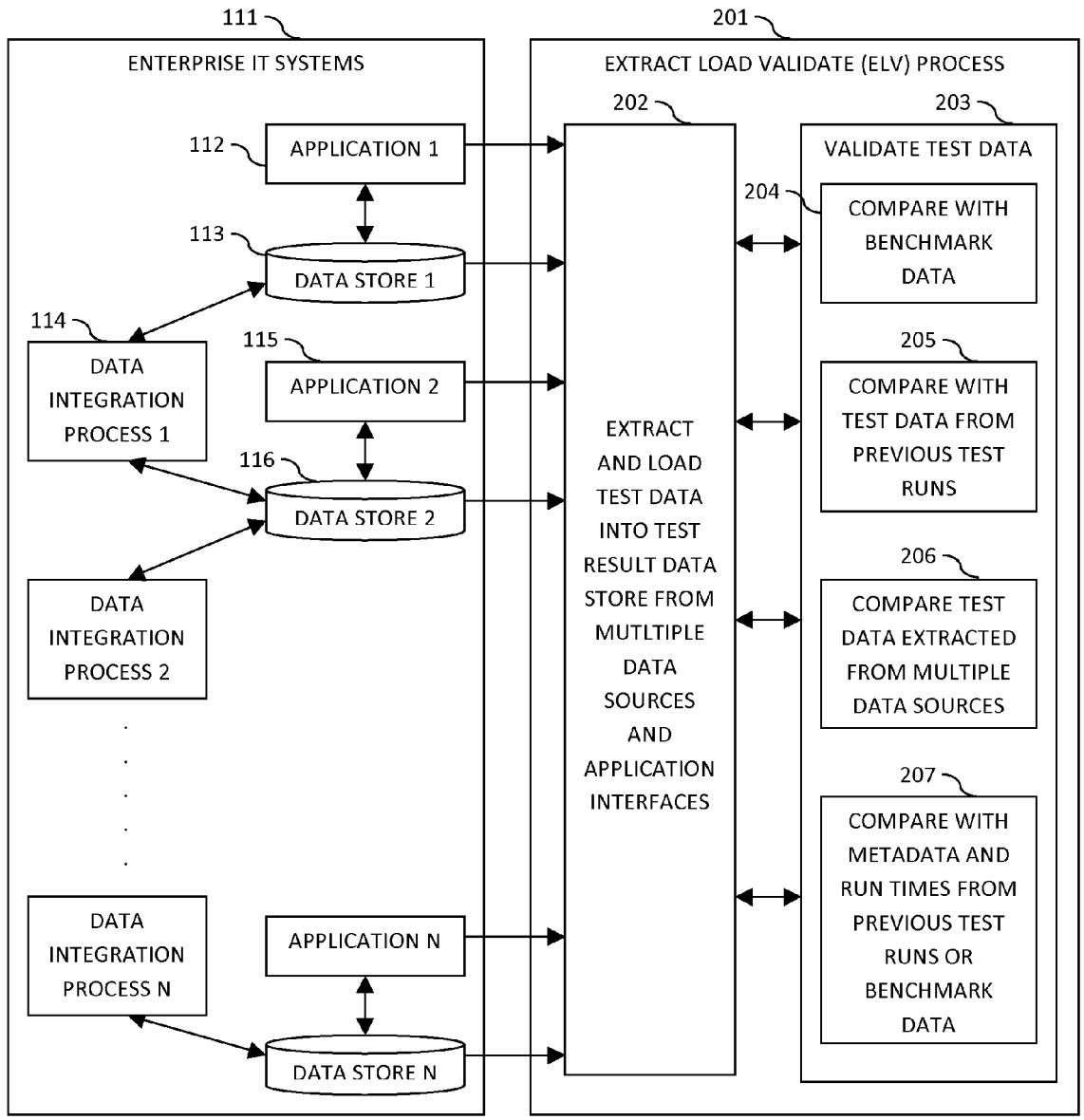
FIG. 3 illustrates a high-level flowchart for a testing process of multiple data integration projects includes presenting the types of validations in the ELV architecture of FIG. 2 in greater detail.

Modern Enterprise IT Systems 111 generally consist of plurality of data integration techniques. The present invention, in one embodiment, can be used to test multiple data integration systems as shown in FIG. 3. The architecture for the present invention uses Extract, Load and Validate (ELV) 201 as the testing process for data integration and business intelligence projects. Test data can be queried and extracted from multiple data sources 113 and application interfaces 114 and loaded 202 into a Test result data store 260 which can be used for validation. The illustrated enterprise IT system 111 includes a plurality of applications 112, 115, etc, with corresponding data stores 113, 116, etc., as well as data integration processes 114, etc. The illustrated enterprise IT system 111 includes N number of applications, data integration processes and data stores, where N may be any suitable integer.

The types of validations 203 in an embodiment of the present invention can include comparing the test data extracted from the multiple data sources and application interfaces with pre-existing bench mark (baseline) data in the test result data store 204. This validation is particularly helpful when the test data queried and extracted from the data sources is not expected to change or remain close to the data stored in the bench mark (baseline) data. For example sales data for the previous quarter is not expected to change. If the bench mark (baseline) data for a previous quarter is different from the current extract of the test data for the same quarter, the validation can be flagged as a failure.

The types of validations 203 in an embodiment of the present invention can include comparing the current extract of test data with the data extracted from previous runs 205. For example this validation can be used to verify that the latest extract of the test data is close (within a specific tolerance level) to what the test data was from a previous run. For instance when an incremental load is run for a data warehouse, we can expect the count of rows in the target a tables to grow incrementally. But if the count doubled, the validation can be set to fail.

The types of validations 203 in an embodiment of the present invention can include comparing between test data extracted from multiple data sources and application interfaces 206. For example this type of validation can be used to compare the test data extracted from a specific report in the data warehouse with that of the test data queried and extracted from the source database in the context of a data warehouse project. In another instance the count of records in the source and target table can be compared. Another example is to verify that the test data extracted from the result of calling a web service is same as the test data queried from the database.

The types of validations 203 in an embodiment of the present invention can include comparing the metadata used by the data sources with that of the benchmark (baseline) data or test data from previous runs 207. An example in the context of a data warehouse, the changes to the OLAP tool metadata can result in unwanted changes in the database query generated by the OLAP query engine for existing reports or it might result in the query to run longer than expected. By using this validation, the database query can be stored in the test result data store as a benchmark (baseline) or from a previous run and compared with the latest database query from the current run.

Since the test data is loaded into a common test result data store from multiple data stores and application interfaces, the ELV process gives the flexibility to define multiple validations for verifying the test data.

Figure 4:
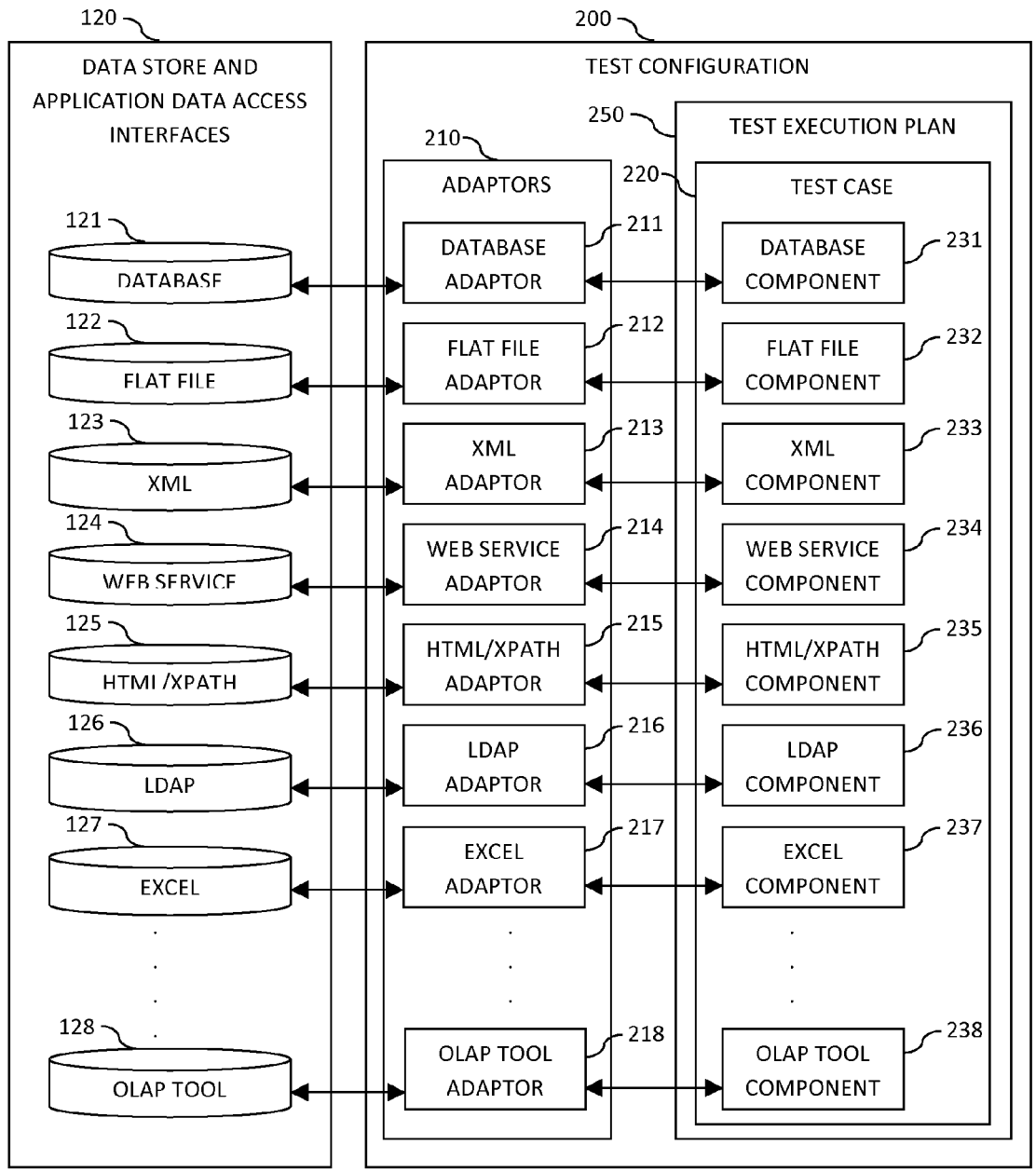
FIG. 4 illustrates a block diagram of how the extraction of the test data from the different types of data sources can be architected in one embodiment of the present invention.

Data source and application interface specific adaptors are provided to extract test data. FIG. 4 shows the block diagram of an embodiment of the present invention which provides adaptors 210 (e.g. Database Adaptor 211, Flat File Adaptor 212, XML Adaptor 213, Web Service Adaptor 214, HTML/XPATH Adaptor 215, LDAP Adaptor 216, Excel Adaptor 217, OLAP Tool Adaptor 218 etc.) for querying and extracting test data from different types of data sources and application interfaces (e.g. Database 121, Flat File 122, XML 123, Web Service 124, HTML/XPATH 125, LDAP 126, Excel 127, OLAP Tool 128 etc.). Besides these custom adaptors can be added to the test configuration that are specific to the application interfaces. There can be variations on how the adaptor connects and extracts data for the different vendor implementations of data sources such as database 121 and OLAP Tool 128. In the example of the adaptor for OLAP Tool, the method to get the data for a report can be different for each OLAP Tool from different software vendors.

The adaptors provide a way to define connections to specific data sources and application interfaces. The specific queries to extract the test data from the data sources and application interfaces are defined in Components (e.g. Database Component 231, Flat File Component 232, XML Component 233, Web Service Component 234, HTML/XPATH Component 235, LDAP Component 236, Excel Component 237, OLAP Tool Component 238 etc.).

The test data extracted from the data sources and application interfaces may include the metadata generated and used by them. For example for a data source of type relational database, the query execution plan is of interest from the query performance perspective. Validations can be defined to verify that the query execution plan did not change after a database software upgrade. The OLAP tool adaptor may retrieve the database specific query generated by the OLAP query engine. Validations can be used to verify whether a change to the OLAP Tool metadata or an upgrade to the OLAP Tool software has resulted in unwanted changes to the database query generated by the OLAP Tool query engine.

Figure 5:
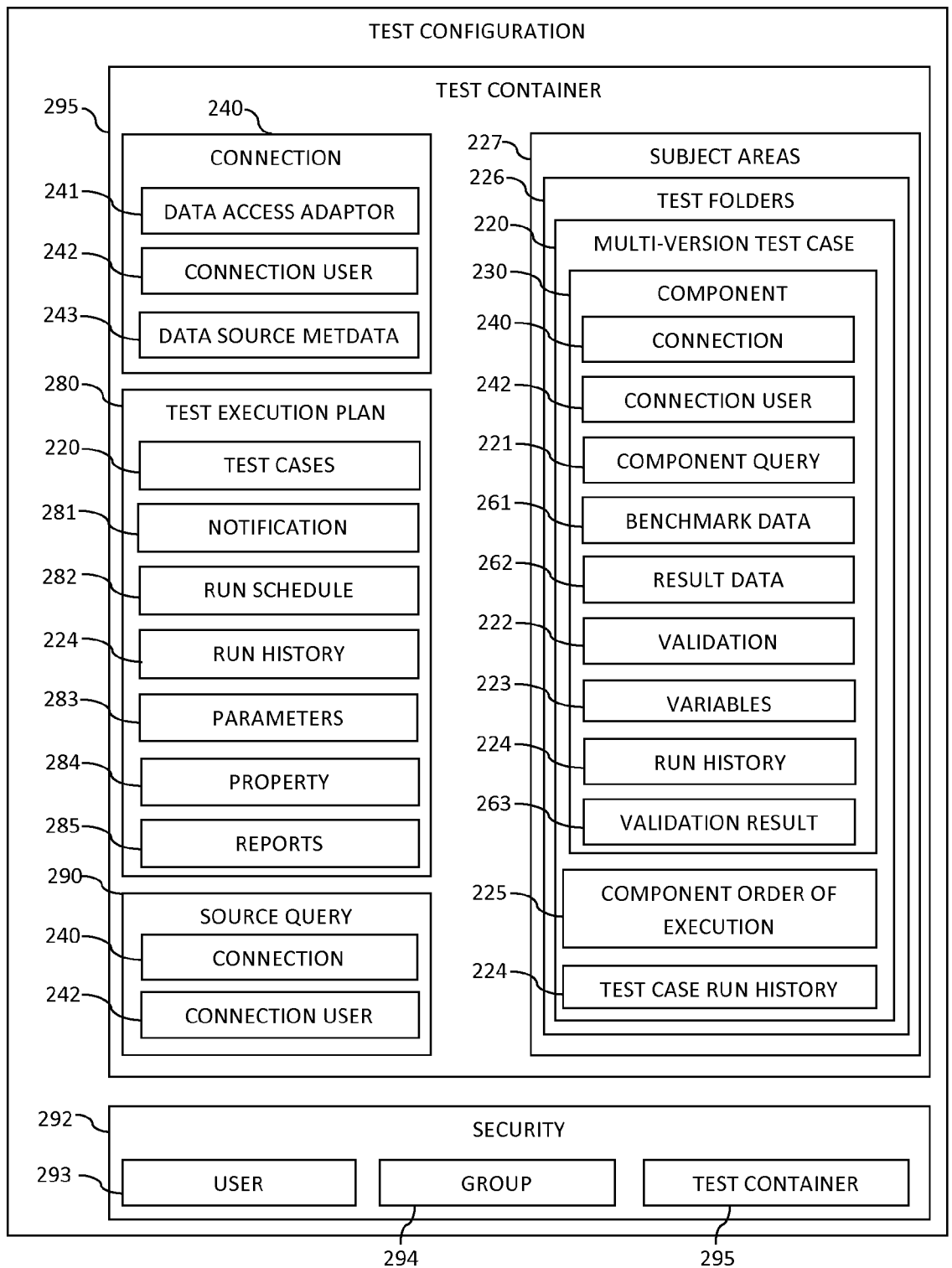
FIG. 5 illustrates various components of a test configuration in one embodiment of the present invention, as well as logical containers for each of the component in the test configuration.

FIG. 5 shows block diagram of the various components of an embodiment of the present invention, wherein it is recognized by one skilled in the art that various additional components have been omitted for brevity purposes only. FIG. 5 illustrates an expanded embodiment of the test configuration 200 of FIG. 2. Connections 240 make use of data source or application interface specific Data Access Adaptors 241 to establish a connection for querying and extracting test data. For example, Java Database Connectivity (JDBC) can be used to connect to the relational database while vendor specific Web Services may be used to connect to an OLAP Tool. In the instance of a Flat File, it can be the location and name of the file while for a web service it can be the web services description language (WSDL) uniform resource locator (URL).

Connection User 242 is the data source or application interface specific user that the connections 240 object uses to connect to the source. For example, database user account can be used for connecting to a database while report user account can be used by the OLAP Connection object for connecting to the OLAP tool. The test data returned by the OLAP tool can be different for the same report depending on the Connection User 242 used to establish the connection. Connection User 242 also dictates the Data Source Metadata 243 available for creating a Component Query 221. The metadata for the relational database can be the tables, columns, views, procedures accessible to specific database connection user. In the example of an OLAP Component type, the metadata can be the list of report elements available for reporting as well the list of predefined reports.

Component 230 is a data source or application interface specific implementation for querying and extracting the test data and metadata. For example, database type of component can use vendor specific connection information to connect to relational database but the type of test data and metadata extracted can be the similar for all vendor implementations. While illustrated in FIG. 5 as a single element, it is recognized that the processing of the operations relate to multiple components 230 and the illustration of a single component is for illustration only and the component 230 can represent any number of components as described herein.

Component Query 221 is the data source or application interface specific query used to get the test data for a specific component 230 in a Test Case 220. For example, the Component Query 221 for a component of type database can be a SQL Query or a call to a stored procedure. In the case of an OLAP tool, the Component Query 221 can be the unique report ID or the report name and path or the logical query of the report. The exact format of the query can vary for vendor specific implementation of the OLAP tool. In an embodiment, a query builder allows for creation of Component Query 221 based on the metadata accessible for the Connection User 242 in a specific Connection 240.

Variables 223 are temporary data stores that can be used within a Component Query 221. They can hold a single value or multiple values which can be a result of a query. For example, while testing incremental ETL, a Variable 223 can be defined to store the last ETL run date. In another example, a Variable 223 can be initialized using an SQL Query with a list of values that can be used in multiple Component Queries 221. Variables 223 can be initialized with a single value like in the example of the last ETL run date or multiple values as in the example of a variable initialized by SQL Query. In the instance of a Test Case 220 where test data from source and target data source is compared, variable 223 can be used to make sure that the same criteria is used to extract the test data from both the Components 230.

Result Data 262 is the output test data obtained as result of running the Component Query 221 in the data source or application interface using the Connection 240 and Connection User 242. It includes the test output data as well as the query execution data specific to the type of data source or application interface. In the example of a relational database, the Result Data 262 can be the output of running a SQL query or from running a processing procedure, for example but not limited to, running a report. In this example, the Result Data 262 extracted after running the SQL query can also include the SQL query execution plan. For the example of OLAP Tool, the Result Data 262 can be the output of running the report as well as the database specific SQL query generated by the OLAP Query engine and the corresponding SQL query execution plan. In addition, the Result Data 262 may also include statistics such as the run time of the database query and the time taken to generate the database query by the OLAP Tool query engine. The query execution data that can be of interest from the testing perspective as it can be different for each component type. For example database query generated by the OLAP Tool query engine is not relevant for a database type of component. Depending on the test scenario, there may be varying need to store the historical Result Data 262 for each Component 230 in a Test Case 220. The Component 230 provides a way to configure the number of previous Result Data 262 that should be stored in the Test Result Data Store 260.

The Result Data 262 can be same every time the Component Query 221 is run or it can change with time. For example, querying for a count of new customers added in the last quarter can be expected to remain same every time it is run but the count of customers added in the current quarter can be expected to change. Benchmark (Baseline) Data 261 is the expected Result Data 262 when a Component Query 221 is run against the data source or application interface. Benchmark (Baseline) Data 261 can either be entered manually by the user or saved from the Result Data 262 after it has been verified to be accurate by the user.

Validations 222 are assertions defined to verify the validity of the Result Data 262. To assert the validity of the Result Data 262, it can be compared to the Benchmark Data 261 or Result Data 262 from previous runs or Result Data 262 from other components. The advantage of the Extract, Load, and Validate (ELV) architecture is that the extracted Result Data 262 is loaded from multiple data source and application interfaces into a single Test Result Data Store 260 which allows for plurality of validations to be defined comparing the Result Data. For example, the result data by running a report in the OLAP Tool can be compared with the result data obtained by querying the database. In another example, result data obtained by running queries against the source and target data can be compared. The comparison can be limited to comparison of counts of records or exact value comparison by running a query or a more complex logic can be used by developing a stored procedure or function to do the comparison in the Test Result Data Store 260. Validations 222 can also provide a provision to specify the variance allowed for the difference found during the comparison. In one embodiment, the Test Result Data Store 260 of FIG. 2 is a relational database and the comparisons can be performed using SQL Queries or stored procedures or functions. Since the type of Result Data 262 available for extraction from the Component 230 can be different for each component type, the types of Validations 222 available can also vary. For example for a data source of type relational database a validation to compare the SQL query execution plan in the Result Data 262 with that of the SQL query execution plan in the Benchmark Data 261 is relevant. Similarly for the OLAP Tool data source, a validation type comparing the data source specific SQL query generated by the OLAP Tool query engine can be relevant.

Validation Result 263 is the output of running the Validation 222. It can be useful to store the Validation Result 263 in the Test Result Data Store 260 of FIG. 2 so that it can be reviewed later manually to understand the reason for success or failure of the Validation 222. For example, a validation comparing the source and target data may output a Validation Result 263 of the differences in the two Component Result Data 262. However in some cases, the validation result can be very large and may be unnecessary to store the entire result. Hence the number of rows of the Validation Result 263 that needs to be saved can be configured.

A Component 230 can be run independently to verify that the Component Query 221 is extracting the right Result Data 263 using the Connection 240 to the data source or application interface. In an embodiment the software can provide a verification routine to check that the Component Query 221 and Validations 222 have been defined properly. Run History 224 for the component stores information on the Component 230 run every time it is run. This includes the Validations that were run as part of the Component 230 run.

A Test Case 220 is created to test a feature or an aspect of a feature. Test Case 220 can make use of one or more Components 230 to achieve this objective. The Component Order of Execution 225 determines the order in which Components 230 belonging to a test case is executed. In an example where the Test Case 220 is comparing the test data queried from the Source and Target data stores, it can consist of three components: Component A to query and extract the Result Data A from source data store; Component B to query and extract the Result Data B from the target data store; and Component C with validations to compare the Result Data A and B loaded by running the Components A and B into the Test Result Data Store 260 of FIG. 2.

In this example, the two Components A and B can be run in parallel before running Component C to validate Result Data A and B. If the specification for the Test Case 220 details extraction of only a sample of data from the source data store and compare it with the data in the target data store, the Component Query 221 of the Component B to extract data from the target data store can make use of a Variable 223 based on Result Data A to dynamically determine what data needs to be extracted from the target data store. In this case Component A, B and C need to execute one after another serially in that order respectively. In one embodiment, the software can provide a graphical user interface to represent each Component 230 that is part of a Test Case 220 as an icon and the Component Order of Execution 225 can be modeled by specifying the arrows connecting the components. All Test Cases 220 can start with a dummy Start Component. In another embodiment, the software can identify the dependencies between the components based on their Component Query 221, Variables 223 and Validations 222 while allowing the user to set the dependencies between the Components 230.

A Test Case 220 verify routine can be made available, where that routine is operative to ensure that all the Components are verified and the Component Order of Execution 225 has been specified appropriately. Run History 224 for a Test Case 220 stores the run details of the Test Case. Running a Test Case 220 will result in running of the Component 230 and its Validations 222. Consequently running a Test Case 220 will result in creation of the Run History 224 for the Components and Validations as well.

The number of Test Cases 220 can quickly grow to a large number. A folder structure to organize the Test Cases 220 can be provided. In one embodiment, Test Cases 220 can be organized in Test Folders 226 and Subject Areas 227.

Test Execution Plan 280 provides a method to group Test Cases 220 into a batch that can be scheduled to run together with limits on the number Test Cases 220 that can run in parallel. Test Execution Plan 280 provides several methods to the user for querying and selecting the Test Cases 220 that can be added to the Test Execution Plan 280. In a simple example, Test Cases 220 can be selected based on the Test Folders 226 or Subject Areas 227 they belong to. In another embodiment, Test Cases 220 can be grouped based on the features they help to test. In the example of a change to the target table, the programming may include providing a method to query and select all the Test Cases 220 that have Components 230 that help test functionality related to the target table.

In an embodiment, Test Execution Plan 280 can be scheduled to run at specific time once or repeating after regular time periods. While the Test Execution Plan 280 is running, user can monitor the execution status of the individual Test Cases 220 along with the details of the Component 230 and Validation 222 execution status. Test Execution Plan 280 can also be stopped and restarted by the user. Another option provided for the user is to run only the Test Cases 220 that failed execution during the last run of the Test Execution Plan 280. There can different modes in which a Test Execution Plan 280 can be run. The run modes can depend on the type of Components 230 and the Result Data 262 they help validate.

In an embodiment, Test Execution Plan 280 can be run any number of possible modes. One mode is a Benchmark Mode, which runs the Test Cases 220 and their Components 230 only to populate the Benchmark Data 261. User has the option to selectively disable the replacing of Benchmark Data 261 in the Components 230 during the execution of Test Case 220 in the Benchmark Mode. This mode of execution is helpful to seed the Benchmark Data 261 prior to implementing a change to the data store or application interface. Another mode is a normal Mode, which runs the Test Cases 220 in the regular mode where all the Components 230 and Validations 222 are executed by default. In an embodiment, the Normal Mode of execution can provide options for selecting the types of Validations 222 that need to be executed. For example if the only change in a Business Intelligence system is the change to the metadata model of an OLAP tool, it may be sufficient to verify that the SQL query generated by the OLAP tool query engine is not affected for existing reports. In this example, it is sufficient to only run the corresponding Components 230 and Validations 222 to verify the SQL Query with that of the Benchmark Data 261 without actually extracting all the report data and storing it in the Result Data 262. Another mode is a performance Test Mode, which runs the Test Cases 220 with the goal of measuring the response time of running queries in the data sources or application interfaces under varying concurrent load. For example, Test Cases 220 with Components 230 of type OLAP can be run with different number of concurrent submissions to measure the response time. A load generator can be provided that can be configured to run the Test Cases in different configurations like random load or fixed load. In one embodiment, the load generator can provide a start running of Test Cases 220 simulating user behavior typical to a Data Warehouse system. Capturing the output of running the Component Query 221 may not be of much importance in this mode but capturing the run times of the Component Queries 221 is important.

New execution modes can be added by defining the rules for selecting and running the Components 230 and their Validations 222 that should be executed as part of the Test Case 220 run.

Notifications 281 provide a way for the user to subscribe and receive notifications and alerts sent out by email or other methods on the execution status of the Test Execution Plan 280.

The Run Schedule 282 of the Test Execution Plans 280 defines how frequently and when a Test Execution Plan 280 should be run.

Parameters 283 are the name-value pairs that are provided as input for a Test Execution Plan 280. Parameters 283 can be used by any of the Test Cases 220 to initiate variables used by the components during the execution of the Test Case 220. For example, a Test Case 220 for testing of incremental ETL run can use Parameters 283 for holding the dates and time of the last two ETL runs. They can be used to initialize variables that are subsequently used in the Component Query 221 for querying and extracting only the Result Data 262 that was processed during a given incremental ETL run.

Properties 284 are the settings used by the Test Execution Plan 280 while execution of Test Cases 220. An example of Property 283 is the number of Test Cases 220 that can run in parallel at any time during the run of the Test Execution 280. Other examples include the number of data base connections and log level. Another example is the mode of run for the Test Execution Plan 280 as well as the details on which types of Components and Validations should be executed for the Test Cases 220 in a given run.

Reports 285 provide insight into the execution of Test Execution Plan 280, Test Cases 220, Components 230 and Validations 222. Reports 285 help compare the current result of the Test Cases 220 and Validations 222 in comparison to the results from the historical runs.

Source Query 290 provides a utility to query the data source or application interface without being part of any Test Case. Source Query 290 makes use of the Connection 240 and Connection User 242 to connect to the data source or application interface for running the query. In one embodiment, Source Query 290 can be similar to the Component 230 without the Validations 222. In the example of a component of type relational database, Source Query 290 can allow the user to run SQL Queries and view the output as well the SQL query execution plan. Source Queries can be saved by the user for rerunning at a later time.

Security 292 is a critical aspect of the system because the test data being queried and extracted from the data sources and application interfaces can contain sensitive information. The access to Connections 240, Connection Users 242, Test Cases 220, Test Execution Plans 280 and Source Queries 290 should be secured. Test Containers 295 provide a method to secure the access to them. In one embodiment, Connections 240, Connection Users 242, Test Cases 220, Test Execution Plans 280 and Source Queries 290 can belong to a Test Container 295 while the access to the Test Container 295 can be controlled by Users 293 and Groups 294. Users 293 define the individual access to the system. It includes information such as login/password along with defining the administration access to the system. In one embodiment the User 293 information is defined and retrieved from LDAP or a database table. Groups 294 define the access profile to the Test Containers 295. In an embodiment, an User 293 can belong to multiple Groups 294. Access levels for each Group 294 to the Test Containers 295 can be defined which in turn sets the access levels for the Users 293 belonging to that Group 294. User 293 can switch between the Test Containers 295 for which they have access. In one embodiment, the access levels can be no access, read only, execute or admin. For example a user with the responsibility to schedule and monitor Test Execution Plans 280 can have admin access to Test Execution Plans 280, read only access to Test Cases 220 and no access to Connections 240.

Test Execution Plans 280 allow for running of Test Cases 220 in parallel. The output data extracted while running the Component Queries 221 belonging to these Test Cases 220 can be very large. Having a Server agent that resides in close proximity to the data sources and application interfaces will help reduce performance problems that might be caused due to network issues.

Figure 6:
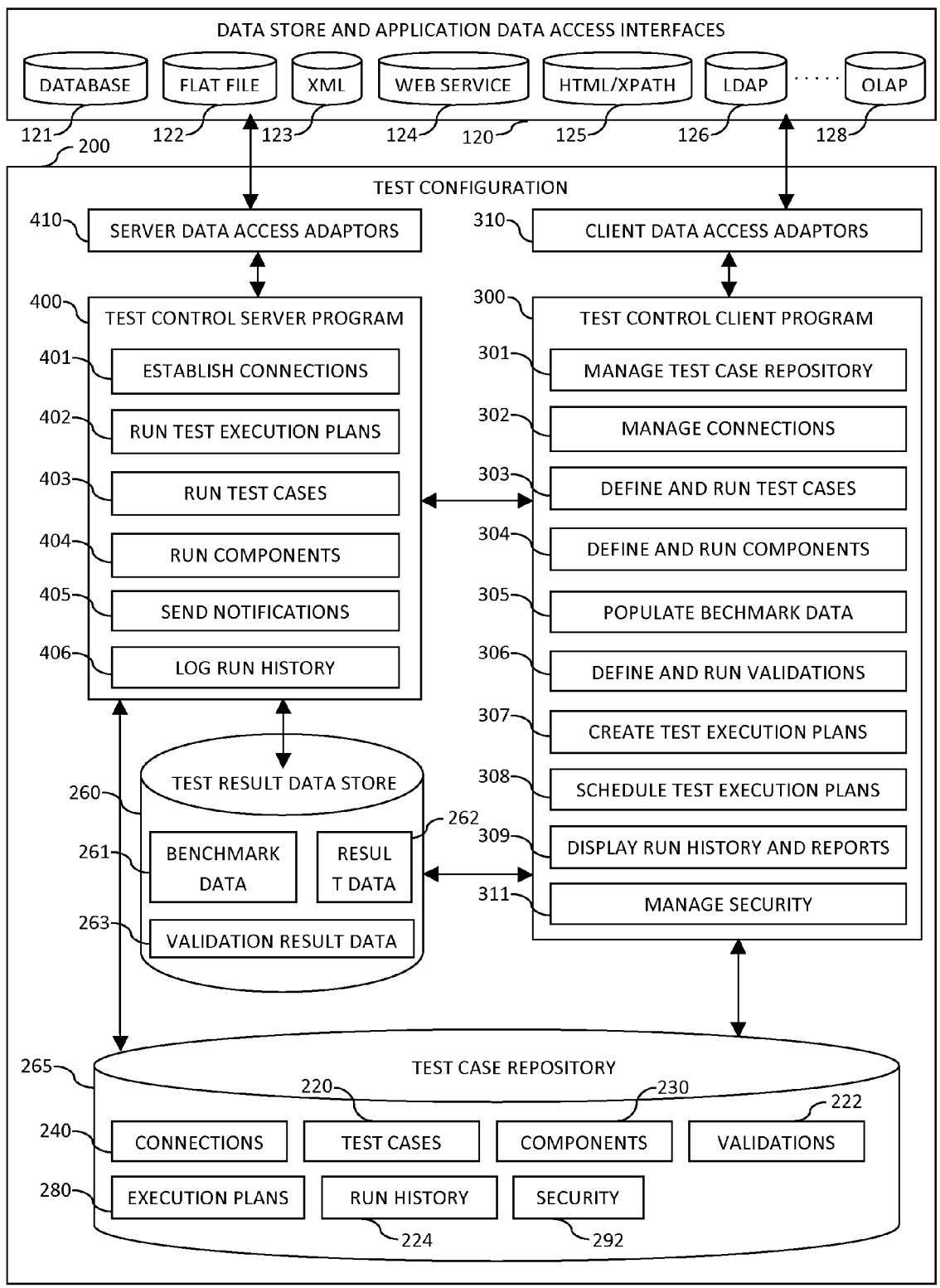
FIG. 6 illustrates one embodiment of an architecture of the test configuration, including sub processes in the server and client programs, as well as the contents of the test result and test case repository data stores.

FIG. 6 shows a block diagram of the architecture of the test configuration in one embodiment. In one embodiment, the architecture of the system can consist of a Client 300 and Server 400 programs as illustrates in FIG. 6.

A Test Case Repository 265 is the data store used to store the definitions of the objects related to the Test Configuration such as Connections 240, Test Cases 220, Components 230, Validations 222, Test Execution Plans 280, Run History 224 and Security 292. In one embodiment, the data store for the Test Case Repository 265 is a relational database consistent with relational databases well known in the art. The Test Case Repository 265 also stores configuration setting for the Test Configuration like the Server settings.

Test Result Data Store 260 is the data store for saving output result data extracted by running Test Cases 220. This includes Benchmark Data 261, Result Data 262 and Validation Result Data 263. Validation Result Data 263 is the output of running Validation 222 on the Result Data 262 and Benchmark Data 263. Each test configuration may be associated with one of more Test Result Data Stores 260 residing in different locations. In one embodiment, Test Result Data Store 260 can be a schema in relational database which also hosts the target data. In this example, performance optimizations can be achieved while extracting data from the target data store to the Test Result Data Store 260 by taking advantage of fact that both are in the same database. In some instances, the Validations 222 can directly be run using the target data store without the need for extracting the Result Data 262. In another embodiment, sensitive data can be isolated and secured between different user groups of the test configuration by having multiple Test Result Data Stores 260.

The Client Program 300 provides a Graphical User Interface for defining the different elements of the system like Test Cases 220, Test Execution Plans 280, Connections 240 and Security 292. In one embodiment, Users 293 can login to the Client Program 300 by providing their login/password information to perform plurality of activities related to the Test Configuration 200. In one embodiment The Test Control Client Program 300 can be a program running on the user's computer while in another embodiment, Client 300 can be thin client like web browser.

The activities supported by The Test Control Client Program 300 include Manage Test Case Repository 301 for setting up The Test Control Client Program 300 connection to the repository and configuring the Server 400 settings.

The activities supported by The Test Control Client Program 300 also include Manage Connections 302 for creating and editing Connections 240 and Connection Users 242 to the data stores and application interfaces 120 as well as Test Result Data Stores 260 and Test Case Repository 265. The Connections 240 can be established by using Client Data Access Adaptors 310 that are capable of extracting both the Test Result Data as well as Test Metadata that can be used for defining Validations 222.

The activities supported by The Test Control Client Program 300 also include Define and Run Test Cases 303 for creating and running Test Cases 220. Since a Test Case 220 can contain multiple components that need to run in a specific order, the graphical user interface can provide a diagrammatic view for adding and relating the Components 230. The Test Control Client Program 300 can also provide multiple wizards for creating Test Cases 220 automatically based on the Data Source and Application interface 120 metadata. For example, a wizard can guide the user in selecting from an existing list of reports in OLAP tool to automatically create Test Cases 220 with specific Validations 222 to compare the Result Data 262 with the Benchmark Data 261. In another example, the wizard can take an input of the source and target table mapping to generate the Test Cases 220 with Validations 222 comparing the Result Data 262 from the source and target data source. The Test Control Client Program 300 provides a way to organize the Test Cases 220 in a folder structure. In one embodiment, Test Cases 220 can be organized into Subject Areas and Test Folders.

The activities supported by The Test Control Client Program 300 also include Define and Run Components 304 for creating Components 230 using the Connections 240 and Connection Users 242 specific to the data source or application interface. Component Query 221 can be defined for the Component 230 using the metadata made available by the Connection 240 to the data source or application interface. Component 230 can be run independently to verify the Result Data 262 returned by the Component Query 221.

The activities supported by The Test Control Client Program 300 also include once the Result Data 262 has been verified, The Test Control Client Program 300 allows for saving it as Benchmark Data 261 in the activity Populate Benchmark Data 305. Alternatively, The Test Control Client Program 300 also allows the user to manually enter and save the Benchmark Data 261.

The activities supported by The Test Control Client Program 300 also include define and run Validations 306 for creating Validations 222 and test running them for a Component 230 using the Result Data 262 and Benchmark Data 261. In one embodiment, the types of Validations 222 supported include, simple text or value compare, SQL Query compare and Procedural code. The types of Validations 222 supported can take advantage of the features provided by the Test Result Data Store 260 for data comparisons. Depending on the type of Component 230, The Test Control Client Program 300 can allow for creation of Validations 222 specific to the Component 230. For example, a Component 230 defined for OLAP Tool can have a Validation 222 comparing the SQL Query generated by the OLAP Tool Query Engine.

The activities supported by The Test Control Client Program 300 also include create test Execution Plans 307 for grouping and running of Test Cases 220 as Test Executions Plans 280. The Test Control Client Program 300 can provide plurality of ways for selecting the Test Cases 220 that can be added to a Test Execution Plan. For example, one simple method of selecting the Test Cases can be based on the Subject Areas and Test Folders they belong to. Another method is to allow for querying the metadata of the Test Cases 220 like the Component Query 221 to identify and select those that test a specific feature of the Data Integration or Business Intelligence project. In the context of a Data Warehouse, having a selection criteria for all the Test Cases 220 that refer to a fact or dimension table might be helpful to selectively run only the Test Cases that are impacted by a table definition changes for those tables.

The activities supported by The Test Control Client Program 300 also include Schedule Test Execution Plans 308 for scheduling and running of Test Execution Plans 280 including the setting of Parameters 283 and Properties 284. The schedule for running of the Test Execution Plans 280 can be saved to the Test Case Repository 265 so that the Test Control Server Program 400 can use the information to start their execution as scheduled.

The activities supported by The Test Control Client Program 300 also include display Run History and Reports 309 for showing the Run History 224 of the Test Execution Plans 280, the related Test Cases 220, Components 230 and Validations 222. Reports 285 provide a chart view of the Test Execution Plan 280 and Test Case 220 run in comparison to the previous runs.

The activities supported by The Test Control Client Program 300 also include Manage Security 311 for managing Users 293, Groups 294, Test Containers 295 and their access. In one embodiment, each User 293 can belong to multiple Groups 294 and each Group 294 can have multiple users 293 as members, as illustrated in FIG. 5. Each Group 294 can have varying levels of access to the Test Containers 295—No Access, Read Only, Execute and Administrator, as noted with respect to FIG. 5. In an embodiment Connections 240 can also be shared across Test Containers 295 with varying access levels—No Access, Read Only, Execute and Administrator. The Test Control Client Program 300 program provides an option to pick a Test Container 295 for the User 293 depending on their Group 294 membership and the Group 294 access to Test Containers. The Test Control Client Program 300 also provides option for Users 293 with administrator access to administer the Security 292 and settings of the Test Control Server Program 400.

In one embodiment, a Test Control Server Program 400 is used for execution of Test Execution Plans 280, Test Cases 220 and Components 230. The Test Control Server Program 400 can be located closer in network proximity to the data sources and application interfaces so that Extraction and Loading of the Result Data 262 can be done more efficiently. In one embodiment, the Test Control Server Program 400 is a multi-threaded java program making use of a scheduler application, such as Quartz® and a data integration tool, such as Scriptella®. To process multiple of Test Cases 220 and Test Execution Plans 280 that are data intensive a plurality of Test Control Server Programs 400 can be run in a clustered configuration. Clustering also offers better reliability in case of failure of one of the Test Control Server Programs 400 because the other Test Control Server Programs 400 can pick up the execution of the Test Execution Plans at the point of failure.

The activities supported by the Test Control Server Program 400 include Establish Connections 401 for connecting to the Test Case Repository 265, Test Result Data Store 260 and the Data Stores and Application Data Access Interfaces 120. The Test Control Server Program 400 uses Server Data Access Adaptors 410 for establishing these connections.

The activities supported by the Test Control Server Program 400 include Run Test Execution Plans 402 for running of Scheduled Test Execution Plans 280 as stored in the Test Case Repository 265 by the Test Result Client Program 300. The Test Control Client Program 300 can also send requests directly to the Test Control Server Program 400 for running of Test Execution Plans 280 using methods such as Web Services or Remote Method Invocation (RMI). The Test Control Server Program 400 can Send Notifications 405 using emails or other forms of communication indicating the execution status of the Test Execution Plans 280.

The activities supported by the Test Control Server Program 400 also include Run Test Cases 403 for running of Test Cases 220 based on requests from the Test Control Client Program 300. Similarly, the Test Control Client Program 300 can request the Test Control Server Program 400 to run Components 230. By executing the Test Cases 220 and Components 230 in the Test Control Server Program 400 the Test Configuration can take advantage of the close proximity of the Test Control Server Program 400 to the Data Source and Application Interfaces 120 for reducing the network latency issues in capturing the Test Result Data. The Test Control Client Program 300

FIGS. 1 through 6 are conceptual illustrations allowing for an explanation of the present invention. Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, Applicant does not intend for any term in the specification or claims to be ascribed an uncommon or special meaning unless explicitly set forth as such. Further, the present invention encompasses present and future known equivalents to the known components referred to herein by way of illustration.

The foregoing description of the specific embodiments so fully reveals the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein.

What is claimed is:

1. A computerized method for testing of data integration and business intelligence projects, the method comprising:
   generating and storing test queries for extracting test data, the test queries can be run on plurality of computing data sources, the computing data sources include at least one of: data stores and application interfaces;
   extracting test data and test query execution metadata from a plurality of computing data sources,
   loading the test data and the test query execution metadata into a test result data store;
   performing a plurality of validation operation on the test data and the test query execution metadata stored in the result data store based on an existing data set, including electronically comparing the test data to the existing data set to determine test data discrepancies and query execution metadata discrepancies; and
   creating a validation report, identifying the test data discrepancies and the query execution metadata discrepancies.

2. The method of claim 1 further comprising:
   loading a plurality of benchmark data in the test result data store; and
   wherein the plurality of validations includes comparing the test data from the plurality of data sources with the benchmark data.

3. The method of claim 1 further comprising:
   loading previous test data in the test result data store; and
   wherein the plurality of validations includes comparing the test data from the plurality of data sources with the previous test data.

4. The method of claim 3, wherein the validation includes a determination that the test data is within a tolerance range of the previous test data.

5. The method of claim 1 wherein the validation includes comparing the test data of a first source from the plurality of sources with the test data from a second source from the plurality of sources.

6. The method of claim 5 wherein the first source is a source database, the second source is a data warehouse, and a third source is an OLAP reporting tool.

7. The method of claim 1 further comprising:
   loading a plurality of benchmark data in the test result data store; and
   wherein the validation includes comparing a plurality of test query execution metadata used by the plurality of data sources with the benchmark data.

8. The method of claim 1 further comprising:
   loading previous test query execution metadata in the test result data store; and
   wherein the validation includes comparing at least a portion of the test query execution metadata used by the plurality of data sources with the previous test query execution metadata.

9. The method of claim 1 wherein the computing data source is a database and the test query execution metadata is a query execution plan.

10. The method of claim 1 wherein the computing data source is an OLAP reporting tool and the test query execution metadata is an SQL query generated by a query engine.

11. The method of claim 1 wherein the source is a database and the database metadata is used for test query generation.

12. The method of claim 1 wherein the source is an OLAP reporting tool and the existing reports and test queries are generated using OLAP project metadata.

13. The method of claim 1 wherein the validations include a plurality of validation operations for each validation of the test data.

14. The method of claim 1 wherein the plurality of validations are performed in parallel operations.

15. The method of claim 1 wherein the validations are in the form of a high-level programming language.

16. The method of claim 1 wherein the validations are in the form of SQL code.

17. The method of claim 1 wherein the validation includes a test execution plan, the test execution plan including a plurality of data format components allowing for the extraction of test data from a plurality of corresponding data formats.

18. A processing apparatus for testing of data integration, the apparatus comprising:
   a memory device having executable instructions stored therein; and
   a processing device, in response to the executable instructions, operative to:
      generate and store test queries for extracting test data, the test queries can be run on plurality of computing data sources, the computing data sources include at least one of: data stores and application interfaces;
      extract test data and test query execution metadata from a plurality of computing data sources,
      load the test data and the test query execution metadata into a test result data store;
      perform a plurality of validation operation on the test data and the test query execution metadata stored in the result data store based on an existing data set, including electronically comparing the test data to the existing data set to determine test data discrepancies and query execution metadata discrepancies; and
      create a validation report, identifying the test data discrepancies and the query execution metadata discrepancies.

19. The apparatus of claim 18, the processing device further operative to:
   load a plurality of benchmark data in the test result data store; and
   wherein the plurality of validations includes comparing the test data from the plurality of data sources with the benchmark data.

20. The apparatus of claim 18, the processing device further operative to:
   load previous test data in the test result data store; and
   wherein the plurality of validations includes comparing the test data from the plurality of data sources with the previous test data.

* * * * *